United States Patent
Chen et al.

(10) Patent No.: US 8,655,054 B2
(45) Date of Patent: Feb. 18, 2014

(54) SYSTEM AND METHOD OF CORRECTING A DEPTH MAP FOR 3D IMAGE

(75) Inventors: Liang-Gee Chen, Taipei (TW); Chung-Te Li, Taipei (TW); Chao-Chung Cheng, Taipei (TW); Yen-Chieh Lai, Taipei (TW); Chien Wu, Taipei (TW); Ling-Hsiu Huang, Tainan (TW)

(73) Assignees: National Taiwan University, Taipei (TW); Himax Technologies Limited, Tainan (TW)

( * ) Notice: Subject to any disclaimer, the term of this patent is extended or adjusted under 35 U.S.C. 154(b) by 232 days.

(21) Appl. No.: 13/226,317

(22) Filed: Sep. 6, 2011

(65) Prior Publication Data

US 2013/0058562 A1   Mar. 7, 2013

(51) Int. Cl.
    *G06K 9/00*    (2006.01)
    *G06K 9/46*    (2006.01)
    *G06K 9/48*    (2006.01)

(52) U.S. Cl.
    USPC ............................ 382/154; 382/191; 382/199

(58) Field of Classification Search
    None
    See application file for complete search history.

(56) References Cited

U.S. PATENT DOCUMENTS 8,401,276 B1 *   3/2013   Choe et al. ............... 382/154

OTHER PUBLICATIONS

Han et al, "Hilbert-Huang Transform-based Local Regions Descriptors," 2007, BMVC, Proceedings of the British Machine Conference, pp. 1-10.*
Doulamis et al, "Unsupervised Semantic Object Segmentation of Stereoscopic Video Sequences," 1999, In Information Intelligence and Systems, International Conference on, pp. 1-7.*
Liu, "Boundary Processing of Bidimensional EMD Using Texture Synthesis," 2005, IEEE Signal Processing Letters, vol. 12, No. 1, pp. 33-36.*
Cheng et al, "A Block-based 2D-to-3D Conversion System with Bilateral Filter," 2009, Consumer Electronics, 2009. ICCE'09. Digest of Technical Papers International Conference on. IEEE, pp. 1-2.*

* cited by examiner

*Primary Examiner* — Barry Drennan
*Assistant Examiner* — David F Dunphy
(74) *Attorney, Agent, or Firm* — Stout, Uxa, Buyan & Mullins, LLP

(57) ABSTRACT

A system and method of correcting a depth map for 3D image is disclosed. A spatial spectral transform unit extracts pixels of object boundaries according to an input image, wherein the spatial spectral transform unit adopts Hilbert-Huang transform (HHT). A correction unit corrects an input depth map corresponding to the input image according to the pixels of object boundaries, thereby resulting in an output depth map.

12 Claims, 4 Drawing Sheets

SYSTEM AND METHOD OF CORRECTING A DEPTH MAP FOR 3D IMAGE

BACKGROUND OF THE INVENTION

1. Field of the Invention

The present invention generally relates to 3D image processing, and more particularly to a system and method of correcting a depth map for 3D image using Hilbert-Huang transform (HHT).

2. Description of Related Art

A three-dimensional (3D) display device is able to convey 3D depth perception to a viewer. As the 3D display devices have become popular nowadays, 3D image processing has also become an important issue in the pertinent field. Depth map, particularly, plays an important role in 3D image processing. As there is no standard way for generating depth information, a variety of approaches have been disclosed for depth map generation, and may be classified into two main types: single-view methods using monocular depth cues and stereo-view methods using binocular disparity.

Regarding the single-view methods, depth information is generated, for example, using contrast and/or blurriness information. However, the estimate depth maps are generally not reliable for the pixels on the boundaries of objects. Regarding the stereo-view methods, depth information is generated, for example, using belief propagation formulating the stereo matching problem. However, for the pixels located on object boundaries, the quality of depth map degrades.

For the foregoing reasons, a need has arisen to propose a novel scheme for improving on depth map to provide better depth quality over conventional methods.

SUMMARY OF THE INVENTION

In view of the foregoing, it is an object of the embodiment of the present invention to provide a system and method of correcting a depth map for 3D image to enhance the depth quality in spatial spectrum.

According to one embodiment, a system of correcting a depth map for 3D image includes a spatial spectral transform unit and a correction unit. The spatial spectral transform unit is configured to extract pixels of object boundaries according to an input image, wherein the spatial spectral transform unit adopts Hilbert-Huang transform (HHT). The correction unit is configured to correct an input depth map corresponding to the input image according to the pixels of object boundaries, thereby resulting in an output depth map.

DETAILED DESCRIPTION OF THE INVENTION

Figure 1A:
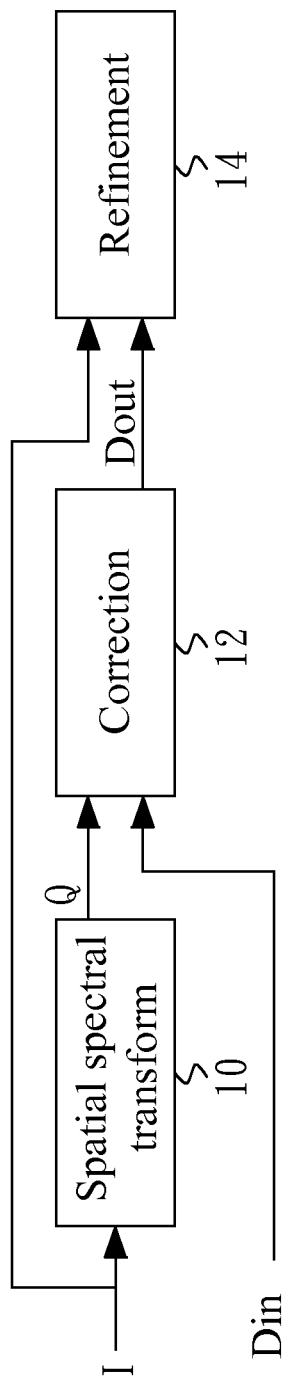
FIG. 1A and FIG. 1B show a block diagram and a flow diagram, respectively, illustrating a system and method of correcting a depth map for 3D image according to one embodiment of the present invention.
Figure 1B:
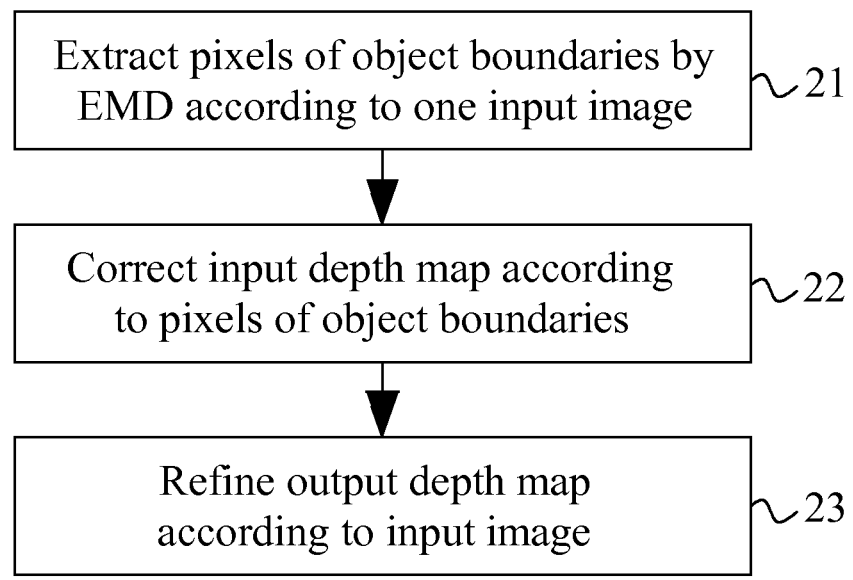

FIG. 1A and FIG. 1B show a block diagram and a flow diagram, respectively, illustrating a system and method of correcting a depth map for three-dimensional (3D) image according to one embodiment of the present invention.

Specifically, in step 21, a two-dimensional (2D) input image I is first processed by a spatial spectral transform unit 10 to obtain (or extract) a pixel set Q composed of object boundaries. In the embodiment, Hilbert-Huang transform (HHT) is specifically adopted in the spatial spectral transform unit 10. HHT provides a way to decompose signals, particularly nonstationary and nonlinear signals, into intrinsic mode functions (IMFs), and then obtain instantaneous frequency data. In HHT, Empirical mode decomposition (EMD) is commonly used to decompose a signal into a small number of components or IMFs. Details of HHT and EMD may be referenced in "The empirical mode decomposition and the Hilbert spectrum for nonlinear and nonstationary time series analysis" by Huang et al. (Proc. of The Royal Society, vol. 454, no. 1971, pp. 903-995, 8 Mar. 1998), the disclosure of which is incorporated herein by reference.

Compared to decomposition of other transform, e.g., Fourier transform, is adaptive and has better locality. Therefore, it could provide information to evaluate the transition points for varying frequency components through the IMFs. Accordingly, the transition points of lower frequency IMFs thus define the object boundaries, while higher frequency IMFs may delineate textures. In the specification, "lower frequency IMFs" is defined as the IMFs whose frequencies are lower than a predetermined threshold.

In the embodiment, instead of direct 2D decomposition for the input image I, 1D decomposition, for row signals Hor of the input image I and/or column signals Ver of the input image I are performed. The row signals Hor and the column signals Ver may be defined as:

$$Hor_{I,k}(x) = I(x,k),$$

$$Ver_{I,m}(y) = I(m,y).$$

Through the decomposition, $IMF(j, Hor_{I,k}(x))$ and $IMF(j, Ver_{I,m}(y))$ may be obtained for all non-negative integer j. In the embodiment, the pixel set Q may be defined, by the following equations:

$$Q = \{(x, y) \mid grad(x, y) > \text{threshold}\},$$

$$grad(x, y) = \max\left(\left|\nabla \sum_{j=p}^{\infty} IMF(j, Hor_{I,y}(x))\right|, \left|\nabla \sum_{j=p}^{\infty} IMF(j, Ver_{I,x}(y))\right|\right)$$

where p is a predetermined threshold for defining low frequency IMFs.

Figure 1C:
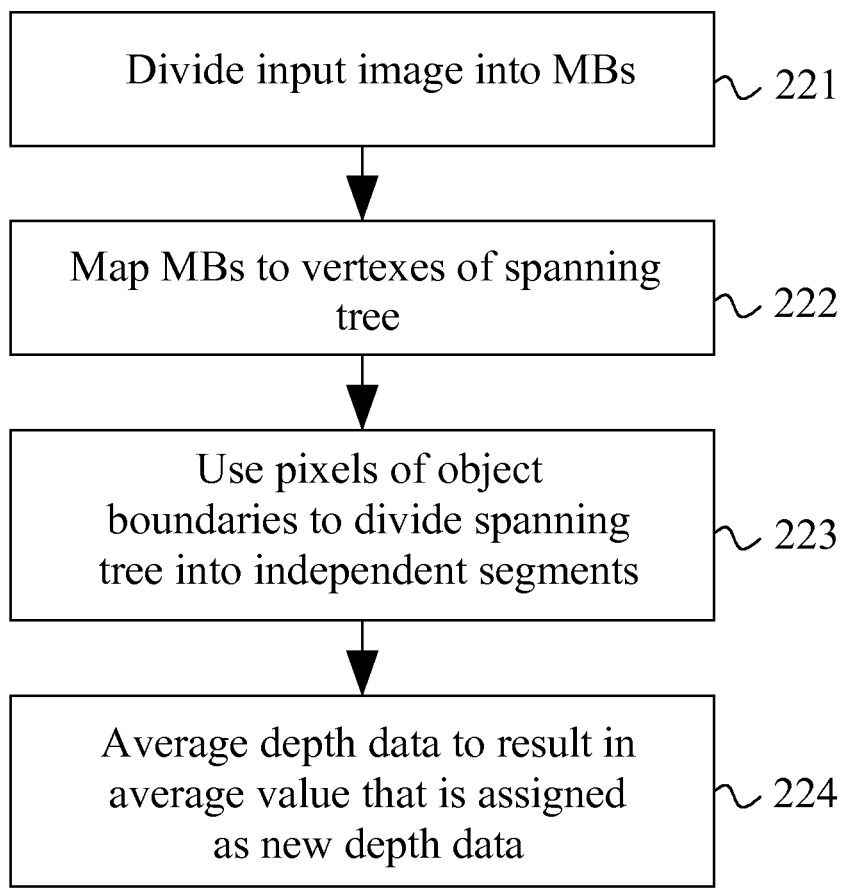
FIG. 1C shows a detailed flow diagram of step 22 of FIG. 1B.
Figure 2C:
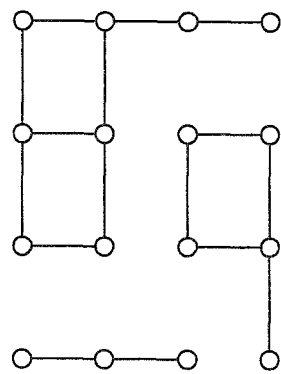
FIG. 2A to FIG. 2C show building the minimum spanning tree of the graph in the correction unit of FIG. 1.
Figure 2B:
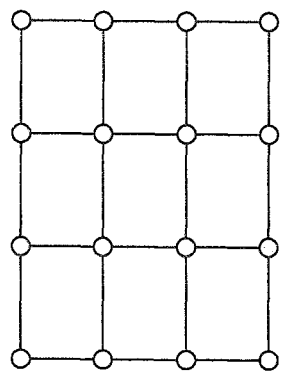
Figure 2A:
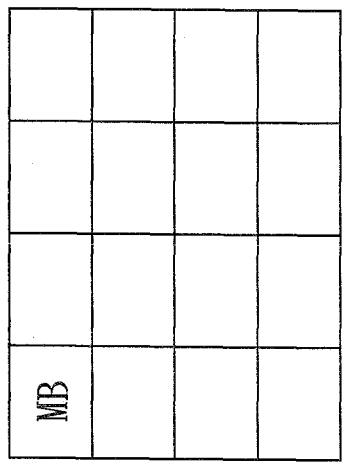

Subsequently, in step 22, an input depth map $D_{in}$ corresponding to the input image I is subjected to automatic correction according to the pixel set Q of object boundaries by a correction unit 12, thereby resulting in an output depth map $D_{out}$. In the embodiment, as detailed in FIG. 1C, a minimum spanning tree of the graph is built in the correction unit 12. Specifically speaking, as shown in FIG. 2A, the input image I is divided into several macro blocks (MBs) (4×4 Mbs are shown in the figure) in step 221. As shown in FIG. 2B, the MBs are respectively mapped to vertexes of the spanning tree in step 222. The MBs are connected with edges, and the weight of the edge is defined by the mean color difference between two adjacent Mbs. Next, in step 223, the pixels of object boundary located between two adjacent MBs are used to divide the corresponding the spanning tree into a number of independent segments, as exemplified in FIG. 2C (three independent segments are shown in the figure). With respect to each segment, the depth data in the input depth map $D_{in}$ corresponding to the segment are averaged in step 224, therefore resulting in an average value, which is then assigned as new depth data in the output depth map $D_{out}$.

Further, in step 23, a refinement unit 14 may be selectively applied on the output depth map $D_{out}$ according to the input image I. In the embodiment, a cross-bilateral filter is adopted in the refinement unit 14. Details of refinement using the cross-bilateral filter may be referenced in "Flash photography enhancement via intrinsic relighting," by Eisemann et al. (ACM Transactions on Graphics, vol. 23, no. 3, pp. 673-678, July 2004), the disclosure of which is incorporated herein by reference.

According to the embodiment, an automatic depth correction method is provided to enhance the depth quality in spatial spectrum. Due to the object boundaries extraction, the depth correction of the embodiment provides better improvement over conventional methods such as dark channel prior or stereo matching. Further, the embodiment may work well for occlusion handling.

Although specific embodiments have been illustrated and described, it will be appreciated by those skilled in the art that various modifications may be made without departing from the scope of the present invention, which is intended to be limited solely by the appended claims.

What is claimed is:

1. A system of correcting a depth map for 3D image, comprising:
    a spatial spectral transform unit using a computer programmed to perform algorithms for extracting pixels of object boundaries according to only an input image, wherein the spatial spectral transform unit adopts Hilbert-Huang transform (HHT);
    a correction unit using the computer programmed to perform algorithms for correcting an input depth map corresponding to the input image according to the pixels of object boundaries, thereby resulting in an output depth map; and
    wherein Empirical mode decomposition (EMD) is used in HHT to decompose the input image into a plurality of intrinsic mode functions (IMFs), and transition points of IMFs with frequency lower than a predetermined threshold define the pixels of object boundaries.

2. The system of claim 1, wherein the spatial spectral transform unit decomposes row signals of the input image or column signals of the input image.

3. The system of claim 1, wherein the correction unit builds a minimum spanning tree according to the input depth map and the pixels of object boundaries.

4. The system of claim 3, wherein the minimum spanning tree is built according to the following steps:
    dividing the input image into a plurality of macro blocks (MBs);
    respectively mapping the MBs to vertexes of a spanning tree, wherein the MBs are connected with edges, and weight of the edge is defined by mean color difference between the two adjacent MBs;
    using the pixels of object boundaries located between the two adjacent MBs to divide the spanning tree into a plurality of independent segments; and
    with respect to each said segment, averaging depth data in the input depth map corresponding to said segment, thereby resulting in an average value, which is then assigned as new depth data in the output depth map.

5. The system of claim 1, further comprising a refinement unit configured to refine the output depth map according to the input image.

6. The system of claim 5, wherein the refinement unit refines the output depth map by a cross-bilateral filter.

7. A method of correcting a depth map for 3D image, comprising:
    extracting pixels of object boundaries according to only an input image using spatial spectral transformation, wherein Hilbert-Huang transform (HHT) is adopted as the spatial spectral transformation; and
    correcting an input depth map corresponding to the input image according to the pixels of object boundaries, thereby resulting in an output depth map; and
    wherein Empirical mode decomposition (EMD) is used in HHT to decompose the input image into a plurality of intrinsic mode functions (IMFs), and transition points of IMFs with frequency lower than a predetermined threshold define the pixels of object boundaries.

8. The method of claim 7, wherein the spatial spectral transformation decomposes row signals of the input image or column signals of the input image.

9. The method of claim 7, in the correction step, a minimum spanning tree is built according to the input depth map and the pixels of object boundaries.

10. The method of claim 9, wherein the minimum spanning tree is built according to the following steps:
    dividing the input image into a plurality of macro blocks (MBs);
    respectively mapping the MBs to vertexes of a spanning tree, wherein the MBs are connected with edges, and weight of the edge is defined by mean color difference between the two adjacent MBs;
    using the pixels of object boundaries located between the two adjacent MBs to divide the spanning tree into a plurality of independent segments; and
    with respect to each said segment, averaging depth data in the input depth map corresponding to said segment, thereby resulting in an average value, which is then assigned as new depth data in the output depth map.

11. The method of claim 7, further comprising a refinement step for refining the output depth map according to the input image.

12. The method of claim 11, in the refinement step, the output depth map is refined by a cross-bilateral filter.

* * * * *